United States Patent
Shang

(10) Patent No.: US 9,621,637 B2
(45) Date of Patent: Apr. 11, 2017

(54) METHOD, DEVICE AND MOBILE TERMINAL FOR CONTROLLING INTERFACE DISPLAY

(71) Applicant: Tencent Technology (Shenzhen) Company Limited, Shenzhen (CN)

(72) Inventor: Liang Shang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 256 days.

(21) Appl. No.: 14/263,962

(22) Filed: Apr. 28, 2014

(65) Prior Publication Data

US 2014/0237033 A1   Aug. 21, 2014

Related U.S. Application Data

(63) Continuation of application No. PCT/CN2013/089192, filed on Dec. 12, 2013.

(30) Foreign Application Priority Data

Dec. 13, 2012 (CN) .......................... 2012 1 0538810

(51) Int. Cl.
*G06F 15/16* (2006.01)
*H04L 29/08* (2006.01)
(Continued)

(52) U.S. Cl.
CPC .............. *H04L 67/10* (2013.01); *G06F 3/048* (2013.01); *G06F 21/00* (2013.01)

(58) Field of Classification Search
CPC ......... H04L 29/08; H04L 67/10; G06F 3/048; G06F 21/00
See application file for complete search history.

(56) References Cited

U.S. PATENT DOCUMENTS

2004/0153675 A1* 8/2004 Dorn ................... G06F 21/6218
726/5
2006/0195907 A1* 8/2006 Delfs ...................... G06F 21/74
726/26
(Continued)

OTHER PUBLICATIONS

Tencent Technology, ISRWO, PCT/CN2013/089192, Mar. 20, 2014, 8 pgs.

(Continued)

*Primary Examiner* — Benjamin M Thieu
(74) *Attorney, Agent, or Firm* — Morgan, Lewis & Bockius LLP

(57) ABSTRACT

A method of displaying user interfaces on an electronic device comprising: detecting a first user input to access an application by a first user, including identifying information of the first user. In response to detecting the first user input, determining whether there is confidential data associated with the application cached in memory. In accordance with a determination that there is confidential data associated with the application cached in memory, comparing identifying information of the first user to the cached confidential data. In accordance with a determination that there is cached confidential data associated with the application but not belonging to the first user, displaying a first user interface corresponding to the application while retrieving confidential data belonging to the first user from a remote server, and replacing the first user interface with a display of the application and confidential data belonging to the first user retrieved from the remote server.

18 Claims, 10 Drawing Sheets

(51) Int. Cl.
   *G06F 3/048*   (2013.01)
   *G06F 21/00*   (2013.01)

(56) References Cited

U.S. PATENT DOCUMENTS

2010/0293543 A1   11/2010   Erhart et al.
2012/0154265 A1   6/2012    Kim et al.

OTHER PUBLICATIONS

Tencent Technology, IPRP, PCT/CN2013/089192, Jun. 9, 2015, 5 pgs.

* cited by examiner

METHOD, DEVICE AND MOBILE TERMINAL FOR CONTROLLING INTERFACE DISPLAY

RELATED APPLICATIONS

This application is a continuation application of PCT Patent Application No. PCT/CN2013/089192, entitled "METHOD, DEVICE AND MOBILE TERMINAL FOR CONTROLLING INTERFACE DISPLAY" filed Dec. 12, 2013, which claims priority to Chinese Patent Application No. 201210538810.3, "Method, Device and Mobile Terminal for Controlling Interface Display," filed Dec. 13, 2012, both of which are hereby incorporated by reference in its entirety.

FIELD OF THE INVENTION

The present application relates to the technical field of mobile terminal, especially relates to a kind of control method, device and mobile terminal for interface display.

BACKGROUND OF THE INVENTION

With the intellectualization of mobile terminal, users are accessible to increasingly rich applications of mobile terminal; for such advantages of the applications of mobile terminal as light weight built-in browser and easy to call, many application programs call the built-in browser of mobile terminal to achieve web page jumping, or call this built-in browser to achieve other certain functions users demand for. However, if built-in browser is called repeatedly in short time, the last web page request will redisplay on web page as cache of browser gets no timely removal; what's worse, it may cause disclosure of important information on previous visited web page by users. This is also true for other applications running on a mobile device. If the application caches personal or confidential data of a user, subsequent users may have visibility of that data, even if only for a short time.

SUMMARY

The above deficiencies and other problems associated with the ability to see cached confidential user data are reduced or eliminated by the invention disclosed below. In some embodiments, the invention is implemented in a computer system that has one or more processors, memory and one or more modules, programs or sets of instructions stored in the memory for performing multiple functions. Instructions for performing these functions may be included in a computer program product configured for execution by one or more processors.

One aspect of the invention involves a computer-implemented method performed by a computer having one or more processors and memory. The computer-implemented method includes: detecting a first user input corresponding to a request to access an application by a first user, the request including identifying information of the first user; in response to detecting the first user input: determining whether there is client-confidential data associated with the application cached in the memory; in accordance with a determination that there is client-confidential data associated with the application cached in the memory: comparing the identifying information of the first user to the cached client-confidential data; in accordance with a determination that there is cached client-confidential data associated with the application but not belonging to the first user: displaying a first user interface corresponding to the application while retrieving client-confidential data belonging to the first user from a remote server; and replacing the first user interface with a display of the application and client-confidential data belonging to the first user retrieved from the remote server.

Another aspect of the invention involves a computer system. The computer system includes memory, one or more processors, and one or more programs stored in the memory and configured for execution by the one or more processors. The one or more programs include: detecting a first user input corresponding to a request to access an application by a first user, the request including identifying information of the first user; in response to detecting the first user input: determining whether there is client-confidential data associated with the application cached in the memory; in accordance with a determination that there is client-confidential data associated with the application cached in the memory: comparing the identifying information of the first user to the cached client-confidential data; in accordance with a determination that there is cached client-confidential data associated with the application but not belonging to the first user: displaying a first user interface corresponding to the application while retrieving client-confidential data belonging to the first user from a remote server; and replacing the first user interface with a display of the application and client-confidential data belonging to the first user retrieved from the remote server.

Another aspect of the invention involves a non-transitory computer readable storage medium storing one or more programs, the one or more programs comprising instructions, which when executed by an electronic device with a display and a camera, cause the device to: detect a first user input corresponding to a request to access an application by a first user, the request including identifying information of the first user; in response to detecting the first user input: determine whether there is client-confidential data associated with the application cached in the memory; in accordance with a determination that there is client-confidential data associated with the application cached in the memory: compare the identifying information of the first user to the cached client-confidential data; in accordance with a determination that there is cached client-confidential data associated with the application but not belonging to the first user: display a first user interface corresponding to the application while retrieving client-confidential data belonging to the first user from a remote server; and replace the first user interface with a display of the application and client-confidential data belonging to the first user retrieved from the remote server.

Another aspect of the invention involves an electronic device, comprising: a display unit configured to display a first user interface corresponding to the application, and a processing unit coupled to the display unit. The processing unit is configured to: detect a first user input corresponding to a request to access an application by a first user, the request including identifying information of the first user; in response to detecting the first user input: determine whether there is client-confidential data associated with the application cached in the memory; in accordance with a determination that there is client-confidential data associated with the application cached in the memory: compare the identifying information of the first user to the cached client-confidential data; in accordance with a determination that there is cached client-confidential data associated with the application but not belonging to the first user: enable display of a first user interface corresponding to the application while retrieving client-confidential data belonging to the first user from a remote server; and replace the first user interface with a display of the application and client-confidential data belonging to the first user retrieved from the remote server.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Figure 1:
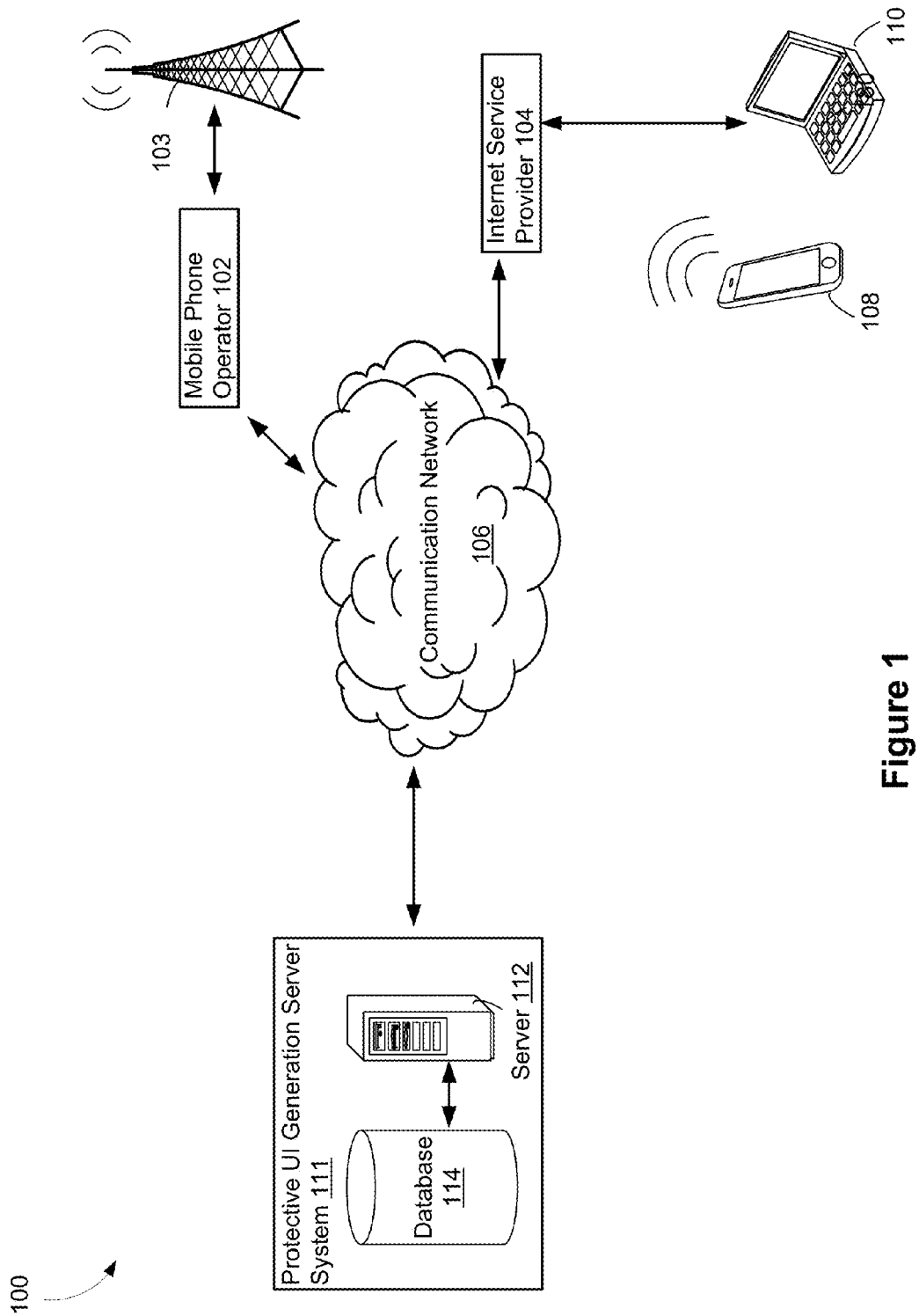
FIG. 1 is a diagram of a client-server environment for protective user interface generation, in accordance with some implementations of the present application.

The realization of purposes, functional characteristics and advantages of the present application will be described further in combination of embodiment and with reference to attached drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following describes further technical scheme of the present application in combination of attached drawings of specification as well as specific embodiment. It should be understood that the specific embodiment described herein is merely used to illustrate the present application, but not to limit the present application.

FIG. 1 is a diagram of a client-server environment 100 for protective user interface generation, in accordance with some implementations of the present application. While certain specific features are illustrated, those skilled in the art will appreciate from the present disclosure that various other features have not been illustrated for the sake of brevity and so as not to obscure more pertinent aspects of the implementations disclosed herein. To that end, the client-server environment 100 includes one or more mobile phone operators 102, one or more internet service providers 104, and a communications network 106.

The mobile phone operator 102 (e.g., wireless carrier), and the Internet service provider 104 are capable of being connected to the communication network 106 in order to exchange information with one another and/or other devices and systems. Additionally, the mobile phone operator 102 and the Internet service provider 104 are operable to connect client devices to the communication network 106 as well. For example, a smart phone 108 is operable with the network of the mobile phone operator 102, which includes for example, a base station 103. Similarly, for example, a laptop computer 110 (or tablet, desktop, smart television, workstation or the like) is connectable to the network provided by an Internet service provider 104, which is ultimately connectable to the communication network 106.

The communication network 106 may be any combination of wired and wireless local area network (LAN) and/or wide area network (WAN), such as an intranet, an extranet, including a portion of the Internet. It is sufficient that the communication network 106 provides communication capability between client devices (e.g., smart phones 108 and personal computers 110) and servers. In some implementations, the communication network 106 uses the HyperText Transport Protocol (HTTP) to transport information using the Transmission Control Protocol/Internet Protocol (TCP/IP). HTTP permits a client device to access various resources available via the communication network 106. However, the various implementations described herein are not limited to the use of any particular protocol.

In some implementations, the client-server environment 100 further includes a protective user interface generation server system 111. Within the protective user interface generation server system 111, there is a server computer 112 (e.g., a network server such as a web server) for receiving and processing data received from the client device 108/110 (e.g., identifying information about the present or prior user). In some implementations, the protective user interface generation server system 111 stores (e.g., in a database 114) and maintains protective user interfaces corresponding to one or more applications.

In some implementations, the protective user interface generation server system 111 sends to a client device 108/110 a protective user interface for a respective application using received user identification information from the client device 108/110 and retrieves the protective user interface from database 114.

Those skilled in the art will appreciate from the present disclosure that any number of such devices and/or systems may be provided in a client-server environment, and particular devices may be altogether absent. In other words, the client-server environment 100 is merely an example provided to discuss more pertinent features of the present disclosure. Additional server systems, such as domain name servers and client distribution networks may be present in the client-server environment 100, but have been omitted for ease of explanation.

Figure 2:
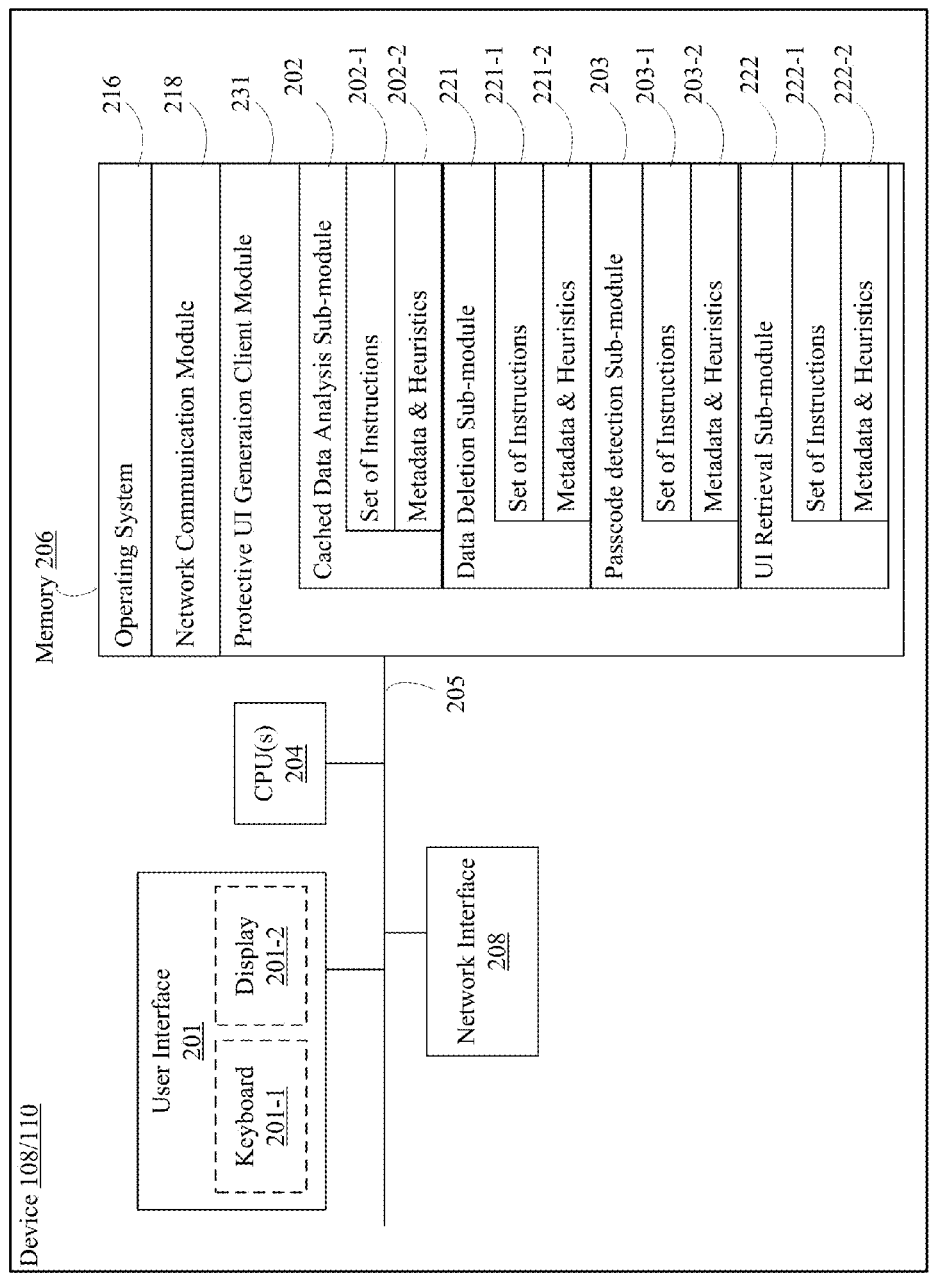
FIG. 2 is a diagram of an example implementation of the device for protective user interface generation, in accordance with some implementations of the present application.

FIG. 2 is a diagram of an example implementation of the device 108/110 for protective user interface generation, in accordance with some implementations of the present application. While certain specific features are illustrated, those skilled in the art will appreciate from the present disclosure that various other features have not been illustrated for the sake of brevity and so as not to obscure more pertinent aspects of the implementations disclosed herein.

Device 108/110 includes one or more processing units (CPU's) 204, one or more network or other communications interfaces 208, a user interface 201 (optionally comprising elements such as a keyboard 201-1 or display 201-2), memory 206, and one or more communication buses 205 for interconnecting these and various other components. The communication buses 205 may include circuitry (sometimes called a chipset) that interconnects and controls communications between system components. Memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 204. Memory 206, including the non-volatile and volatile memory device(s) within memory 206, comprises a non-transitory computer readable storage medium.

In some implementations, memory 206 or the non-transitory computer readable storage medium of memory 206 stores the following programs, modules and data structures, or a subset thereof including an operating system 216, a network communication module 1218, and a protective user interface generation client module 231.

The operating system 216 includes procedures for handling various basic system services and for performing hardware dependent tasks.

The network communication module 218 facilitates communication with other devices via the one or more communication network interfaces 208 (wired or wireless) and one or more communication networks, such as the internet, other wide area networks, local area networks, metropolitan area networks, and so on.

In some implementations, the protective user interface generation client module 231 includes a cached data analysis sub-module 202 for looking for cached data associated with a respective application, comparing the cached data to user identification information for the current user and optionally retrieving the cached user data. To this end, the cached data analysis sub-module 202 includes a set of instructions 202-1 and, optionally, metadata 202-2. In some implementations, the protective user interface generation client module 231 includes a data deletion sub-module 221 having a set of instructions 221-1 (e.g., for optionally deleting any confidential data stored in memory) and, optionally, metadata 221-2, as well as a passcode detection sub-module 203 having a set of instructions 203-1 (e.g., for optionally detecting correct user input of a passcode on the protective user interface) and optionally metadata 203-2. In some implementations, the protective user interface generation client module 231 includes a user interface retrieval sub-module 222 having a set of instructions 222-1 (e.g., for optionally retrieving one or more elements of the protective user interface from a remote server or locally stored information on device 108/110) and, optionally, metadata 221-2.

Figure 3:
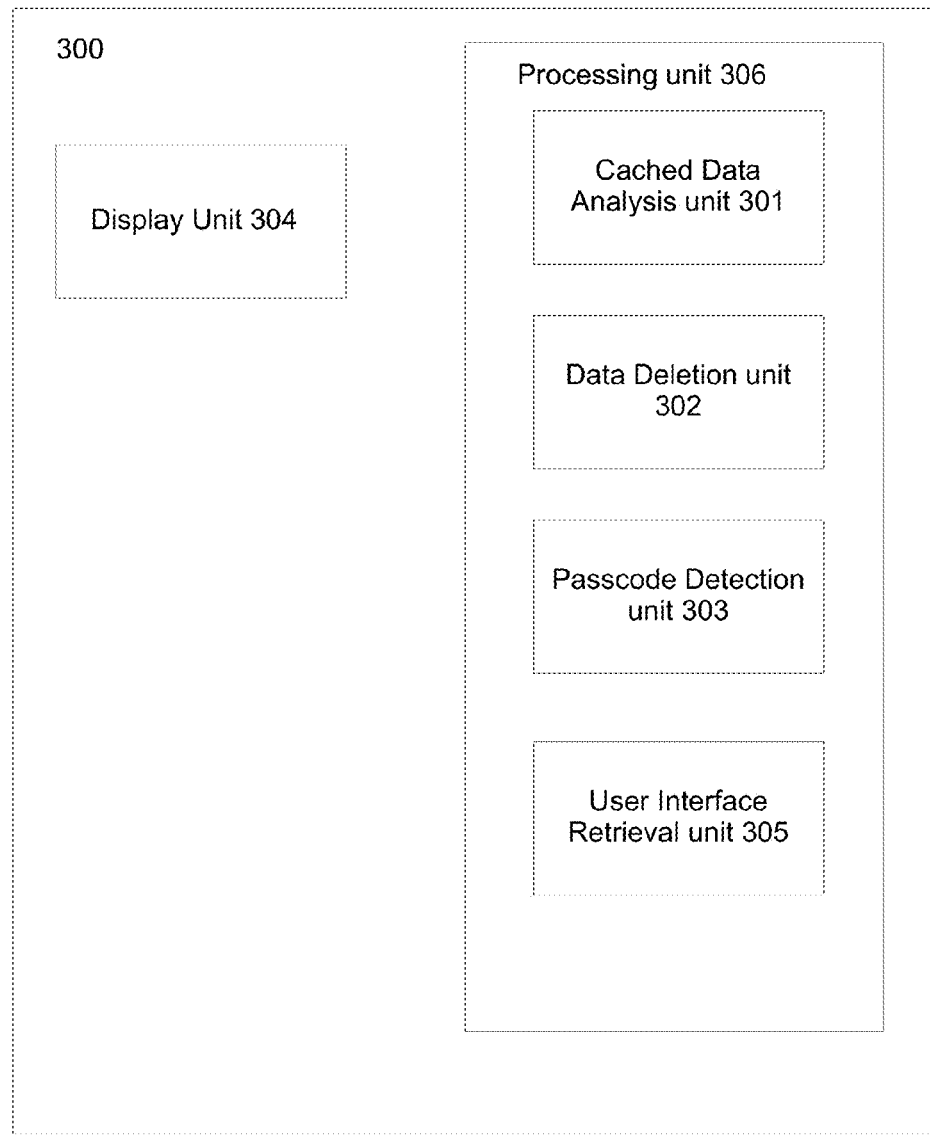
FIG. 3 is a structural diagram of a realization apparatus of protective user interface generation in accordance with some implementations of the present application.

FIG. 3 is a structural diagram of realization device 300 of protective user interface generation based on the embodiment of the present application.

As is shown in FIG. 3, this device includes: a display unit 304, and a processing unit 306 comprising a cached data analysis unit 301, data deletion unit 302, passcode detection unit 303, and user interface retrieval unit 305, among which:

Cached data analysis unit 301: configured to look for cached data associated with a respective application, compare the cached data to user identification information for the current user and optionally retrieve the cached user data;

Data deletion unit 302: configured to delete any confidential data stored in memory;

Passcode detection unit 303: configured to detect correct user input of a passcode on the protective user interface;

User interface retrieval unit 305: configured to retrieve one or more elements of the protective user interface from a remote server or locally stored information on device.

Display unit 304 is configured to display a protective user interface, and a normal user interface for a respective application in accordance with various embodiments described herein.

It is acceptable to integrate the device shown in FIG. 3 into hardware entities of a variety of networks. For example, the realization device for the generation of a protective user interface is allowed to be integrated into: devices including feature phone, smart phone, palmtop, personal computer (PC), tablet computer or personal digital assistant (PDA), etc.

The mentioned mobile terminal can be smart phone, tablet computer and so on, and the mentioned application program can be built-in browser of mobile terminal, game, micro blog, WeChat, Baidu space, QQ space, etc.

The following takes start of game lobby in smart phone as an example, and describes in detail the specific application of control method of interface display of the present application.

Figure 4A:
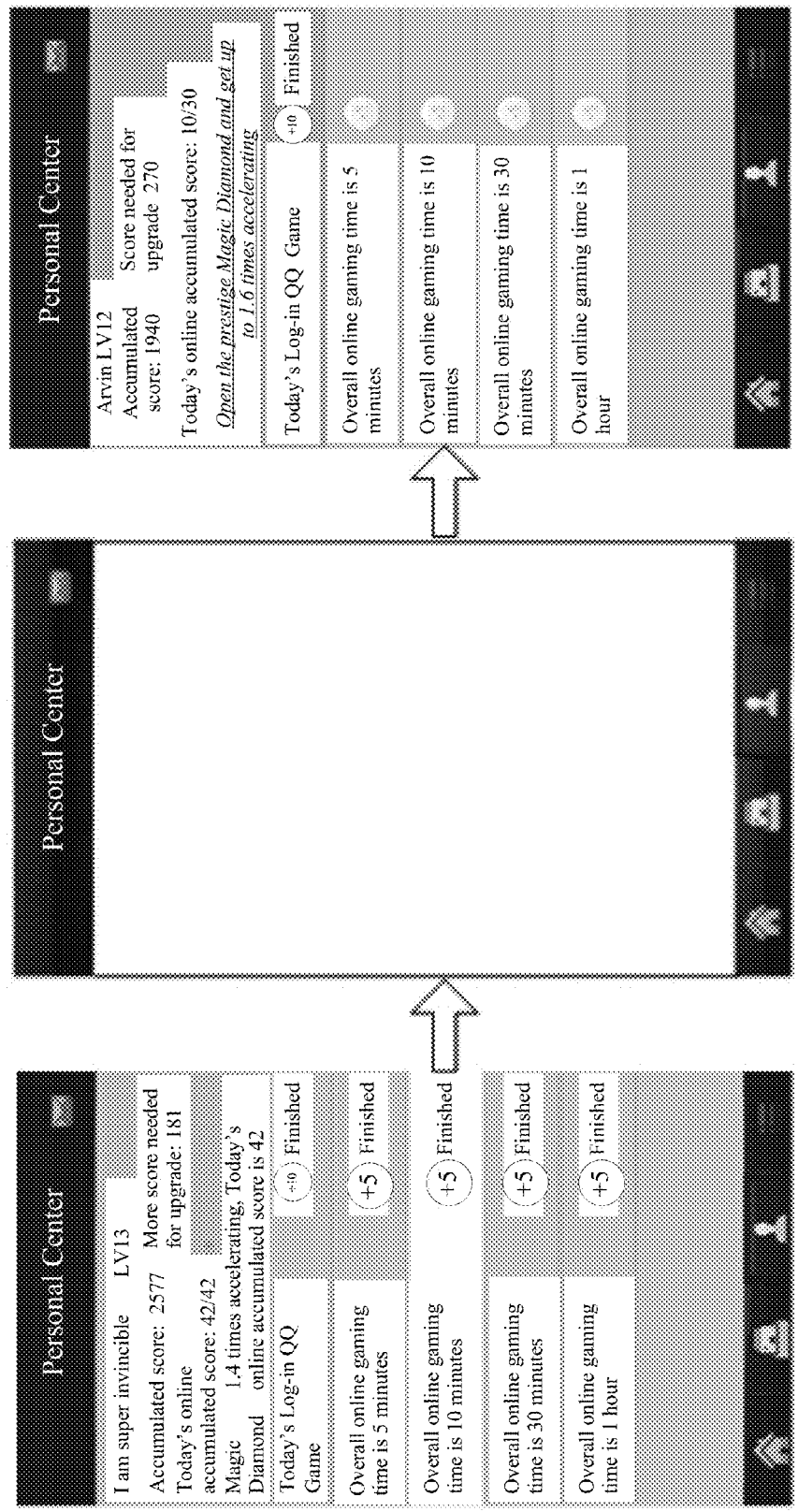
FIGS. 4A-4D illustrate exemplary embodiments of the protective user interface of the present application.

Reference will now be made to FIGS. 4A-4D, representing exemplary embodiments of the protective user interface. FIG. 4A represents the existing problem with displaying retrieved prior user data from cached memory on a mobile device. FIG. 4A is a schematic diagram of display procedure when commonly-used mobile terminal logs in game lobby to obtain pages of personal information; as shown in FIG. 4A, when mobile terminal calls built-in browser to log in game lobby to obtain page of personal information, mobile terminal will display personal information of the previous user firstly, and during obtaining the required data, refresh action is displayed by dull white screen, the required user's information this time will be displayed only after the required data is obtained. As the method shown in FIG. 4A displays personal information of the previous user, it will thus lead disclosure of user's personal information easily, creating such risks of unauthorized use by others as stealing user's account.

Figure 4B:
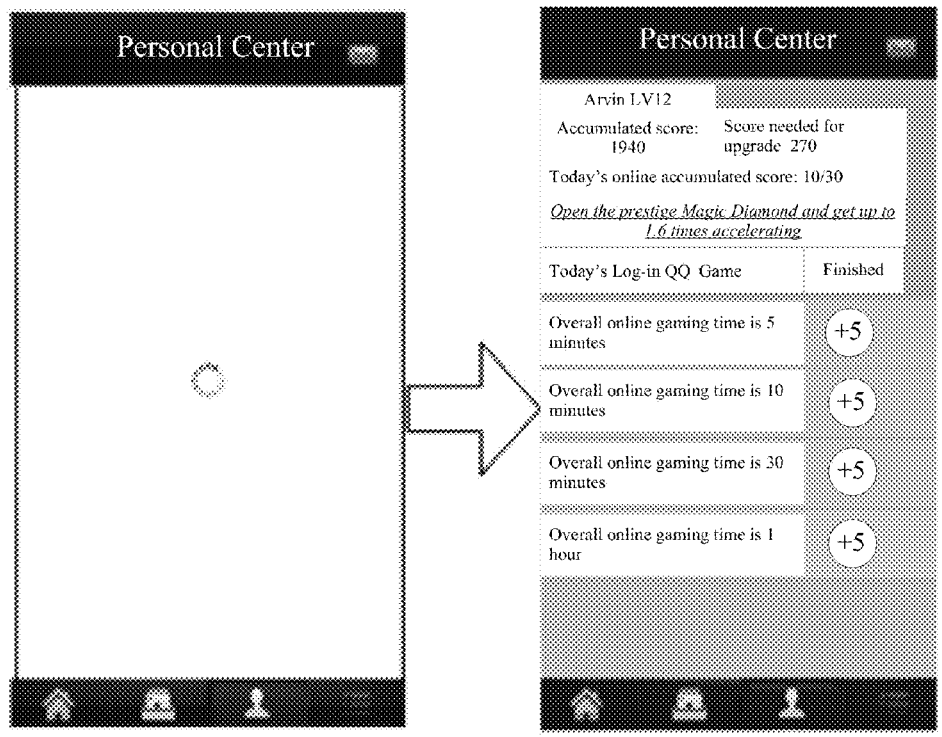

After the control method of interface display of the present application is used, refer to FIG. 4B for interface display process of mobile terminal logging in game lobby once again, FIG. 4B shows a schematic diagram for a specific application scene of the control method of interface display according to the present application; in this embodiment, logging modes of game lobby include: as selecting to save user's name and password, allowing to use direct logging mode without entering user's name and password when logging once again; it also includes logging mode by which user's name and password shall be reentered every time if user's name and password are not saved. As shown in FIG. 4B, after user starts game lobby in smart phone, clicking "personal information" button, mobile terminal intercepts interface display corresponding to cache data not to be removed, during obtaining responsive data, mobile terminal will display directly preset interface, as image animation shown in FIG. 4B; after requested user's information is obtained, mobile terminal switches directly preset interface to corresponding application interface, that is to display the requested user's personal information by user this time; interface display of personal information of the previous user corresponding to cache data in FIG. 4A will be avoided, eliminating the risk of disclosing user's personal information.

In the embodiment, after the request for accessing application program is received, interception command is triggered; according to interception command, intercept interface display corresponding to cache data; obtaining preset interface data, displaying preset interface; the method, by which according to the mentioned request for accessing application program, detecting the mentioned requested responsive data is obtained, switch the mentioned preset interface to application interface corresponding to the mentioned responsive data, has beneficial effects to eliminate the phenomenon where the interface corresponding to cache data is displayed firstly during mobile terminal calling application program, meanwhile, avoiding disclosure of user's personal information.

When users start a certain specific application program of mobile terminal, display module of preset interface receives the request for accessing this application program, meanwhile, background of the mobile terminal applies for application data corresponding to this application program; if this application program can be obtained only through accessing Internet, then background will apply for obtaining the corresponding application program to Internet; if this application program only needs to access a certain specific application program of mobile terminal itself such as games of client-side, then background will apply for obtaining the corresponding application data to the corresponding application program. After display module of preset interface receives the request for accessing application program, interception command is triggered, according to this interception command, while obtaining responsive data corresponding to this access request, display module of preset interface intercepts interface display corresponding to cache data; as these cache data call application program repeatedly in short time, whereas, cache of this application program gets no timely removal, when accessing this application program once again, interface corresponding to these cache will be displayed, to avoid this situation, when display module of preset interface receives request for accessing this application program, interface display corresponding to cache data shall be intercepted for the purpose of preventing interface displayed based on the cache data from disclosing personal information of the previous user.

In a preferable embodiment, display module of preset interface can obtain preset interface data and display preset interface through the following modes:

Display module of preset interface obtains the screen data of start interface of the mentioned application program, and takes the mentioned screen data as the mentioned preset interface data; when application program starts, in the absence of picture content to be displayed, start interface of application program is generally white, commonly referred to as "white screen", display module of preset interface obtaining screen data when start interface is white screen, and taking the screen data of white screen as preset interface data; draw preset interface based on the preset interface data; during obtaining the responsive data of access request of application program, display module of preset interface displays the preset interface.

In a preferable embodiment, the mentioned preset interface includes: preset picture and animation; preset interface data can be picture data and animation data accordingly. The mentioned preset interface presents different display forms according to different preset interface data, for example, the preset interface displayed by the display module of preset interface can be displayed as: picture of one person, picture of landscape and so on; or, the display module of preset interface can display a section of animation, video, etc., to avoid users become upset during waiting mobile terminal to obtain responsive data, so preset interface is displayed with more flexibility and diversity.

It is understood for technical personnel in this field that display of the mentioned preset interface can be set at their options, and this embodiment makes no limit for specific embodiment of preset interface.

Display module of application interface, configured to detect whether the mentioned requested responsive data is obtained based on the mentioned request for accessing to application program; if it is Yes, then switch the mentioned preset interface to application interface corresponding to the mentioned responsive data.

After request for accessing application program is received, display module of preset interface displays preset interface, meanwhile, display module of application interface keeps detecting whether the responsive data corresponding to this request is obtained based on access request; if it is Yes, then display module of application interface will switch directly preset interface to application interface corresponding to responsive data, and display this application interface.

In a preferable embodiment, if display module of application interface detects that responsive data corresponding to access request has not been obtained, then the display module of preset interface keeps displaying preset interface; if the corresponding responsive data has not been obtained after a certain period of time, then allow the display module of application interface to send a prompt of failure in accessing application program, and display this prompt for users to read. When responsive data corresponding to access request is not obtained, mobile terminal can conduct corresponding operation based on preset program, for instance, jumping directly to the main page of mobile terminal or the list interface of application program; the embodiment makes no limit for the corresponding operation of mobile terminal when detecting that the mentioned requested responsive data is not obtained.

In a preferable embodiment, display module of application interface displays application interface corresponding to responsive data, meanwhile, deletes completely the mentioned cache data. Taking application of built-in browser of mobile phone as an example, as cache file will be left during the operation of built-in browser of mobile phone, if built-in browser is called repeatedly in short time, then cache file left as a result of operation of browser will get no timely removal, when starting browser once again, browser will read cache file firstly and display it, then request the needed web page and refresh and display it; after cache file is deleted completely, interface display corresponding to cache file as well as disclosure of users' information can be avoided.

The mentioned mobile terminal can be smart phone, tablet computer and so on, and the mentioned application program can be built-in browser of mobile terminal, game, micro blog, WeChat, Baidu space, QQ space, etc.

Refer to specific description of embodiment mentioned in FIG. 4A and FIG. 4B for the specific application scene of control device of interface display of the present application, and redundant descriptions will be avoided.

In the embodiment, after the request for accessing application program is received, interception command is triggered; according to interception command, intercept the interface display corresponding to cache data; obtaining preset interface data, displaying preset interface; according to the mentioned request for accessing application program, detect the mentioned requested responsive data is obtained, switch the mentioned preset interface to application interface corresponding to the mentioned responsive data, provided with beneficial effects to eliminate the phenomenon where the interface corresponding to cache data is displayed firstly during mobile terminal calling application program, meanwhile, avoiding disclosure of user's personal information.

After mobile terminal receives request for accessing application program, it displays preset interface, at the same time, keeps detecting whether responsive data corresponding to this request is obtained; if it is Yes, switch directly preset interface to application interface corresponding to responsive data, and display this application interface.

In a preferable embodiment, if detecting that responsive data corresponding to access request has not been obtained, then mobile terminal keeps displaying preset interface; if the corresponding responsive data has not been obtained after a certain period of time, then allow mobile terminal to send a prompt of failure in accessing application program, and display this prompt for users to read. When responsive data corresponding to access request is not obtained, mobile terminal can conduct corresponding operation based on preset program, for instance, jumping directly to the main interface of mobile terminal or the list interface of application program; the embodiment makes no limit for the corresponding operation of mobile terminal when detecting that the mentioned requested responsive data is not obtained.

In a preferable embodiment, mobile terminal displays application interface corresponding to responsive data, meanwhile, deletes completely the mentioned cache data. Taking application of built-in browser of mobile phone as an example, as cache file will be left during the operation of built-in browser of mobile phone, if built-in browser is called repeatedly in short time, then cache file left as a result of operation of browser will get no timely removal, when starting browser once again, browser will read cache file firstly and display it, then request the needed web page and refresh and display it; after cache file is deleted completely, interface display corresponding to cache file as well as disclosure of users' information can be avoided.

In a preferable embodiment, the mentioned preset interface includes: preset picture and animation; preset interface data can be picture data and animation data accordingly. The mentioned preset interface presents different display forms according to different preset interface data, for example, preset interface can be displayed as: picture of one person, picture of landscape and so on; or, it can display a section of animation, video, etc., to avoid users become upset during waiting mobile terminal to obtain responsive data, so preset interface is displayed with more flexibility and diversity.

Figure 4C:
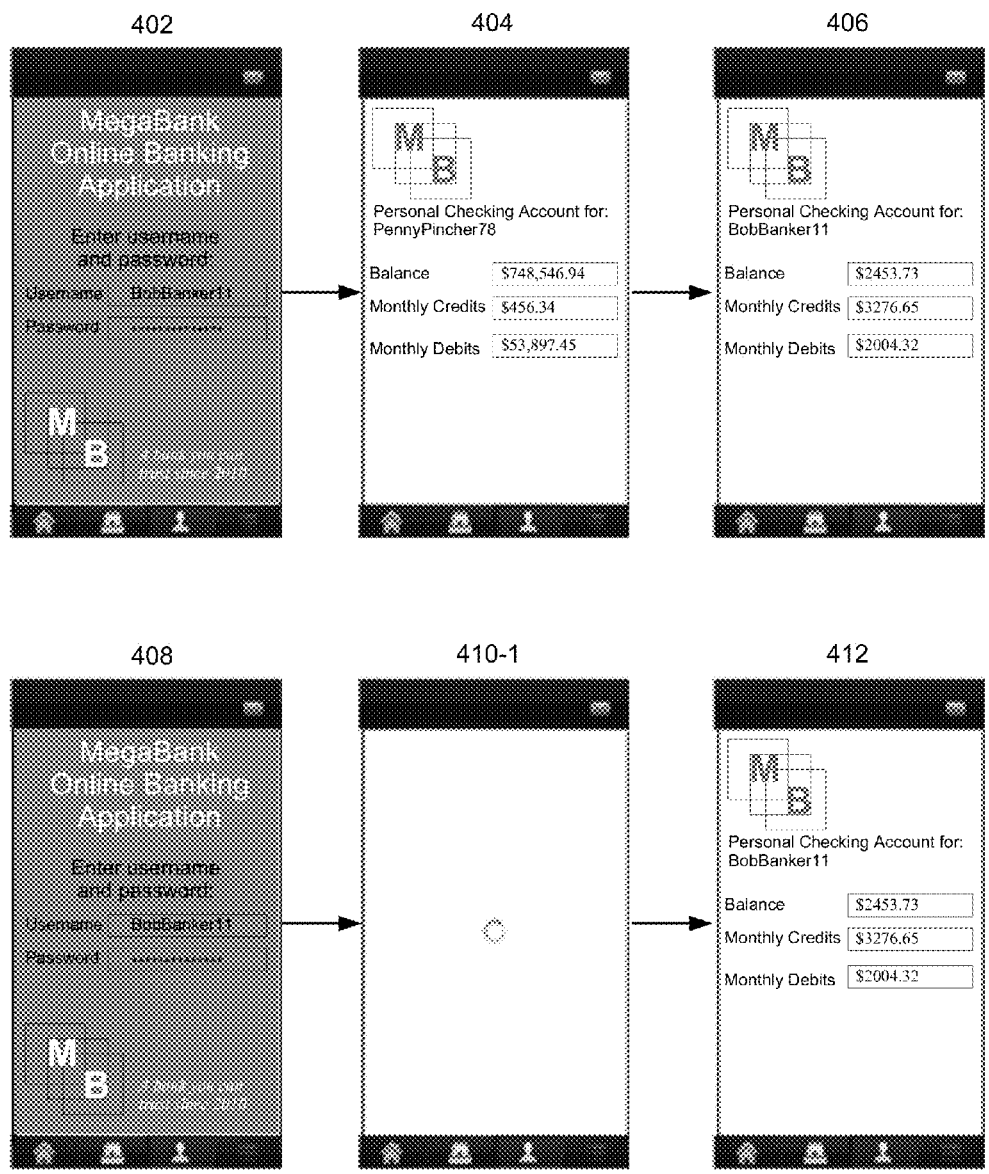

FIG. 4C illustrates an exemplary representation of the protective user interface. For example, in terms of the existing problem, in FIG. 4C, user interface 402 depicts the first loaded user interface of a banking application, opened by a first user (e.g., BobBanker11). After obtaining identifying information for the first user (e.g., BobBanker11's username and password), the application briefly displays, as shown in user interface 404, the cached user data of another, prior user of the same application on the same mobile device (e.g., PennyPincher78). In user interface 406, the application has retrieved the first user's (e.g., BobBanker11) personal user data and displays it in the application. Although in some cases, it may only be a short time duration when cached user data is displayed before the signed-in user's information is displayed.

FIG. 4C also shows an embodiment of the present application, depicted in user interfaces 408, 410-1 and 412. In user interface 408, the first user enters identifying information, as in user interface 402 (e.g., BobBanker11's username and password). For FIGS. 4C and 4D, the first user will refer to a user that has entered some identifying information into a respective application. In some embodiments, in response to entry of the identifying information in user interface 408, the application displays user interface 410-1, while it retrieves the first user's personal user data from a remote server. In some embodiments, after a predetermined amount of time estimated to allow for data retrieval from a server (e.g., 2 seconds), the application will display another user interface comprising application data and the user's personal data (e.g., user interface 412). In some embodiments, the application will display user interface 412, only after it has successfully received the user's personal information. User interface 410-1 is one example of a protective user interface, displayed to protect unintentional disclosure of cached personal user data associated with a respective application.

Figure 4D:
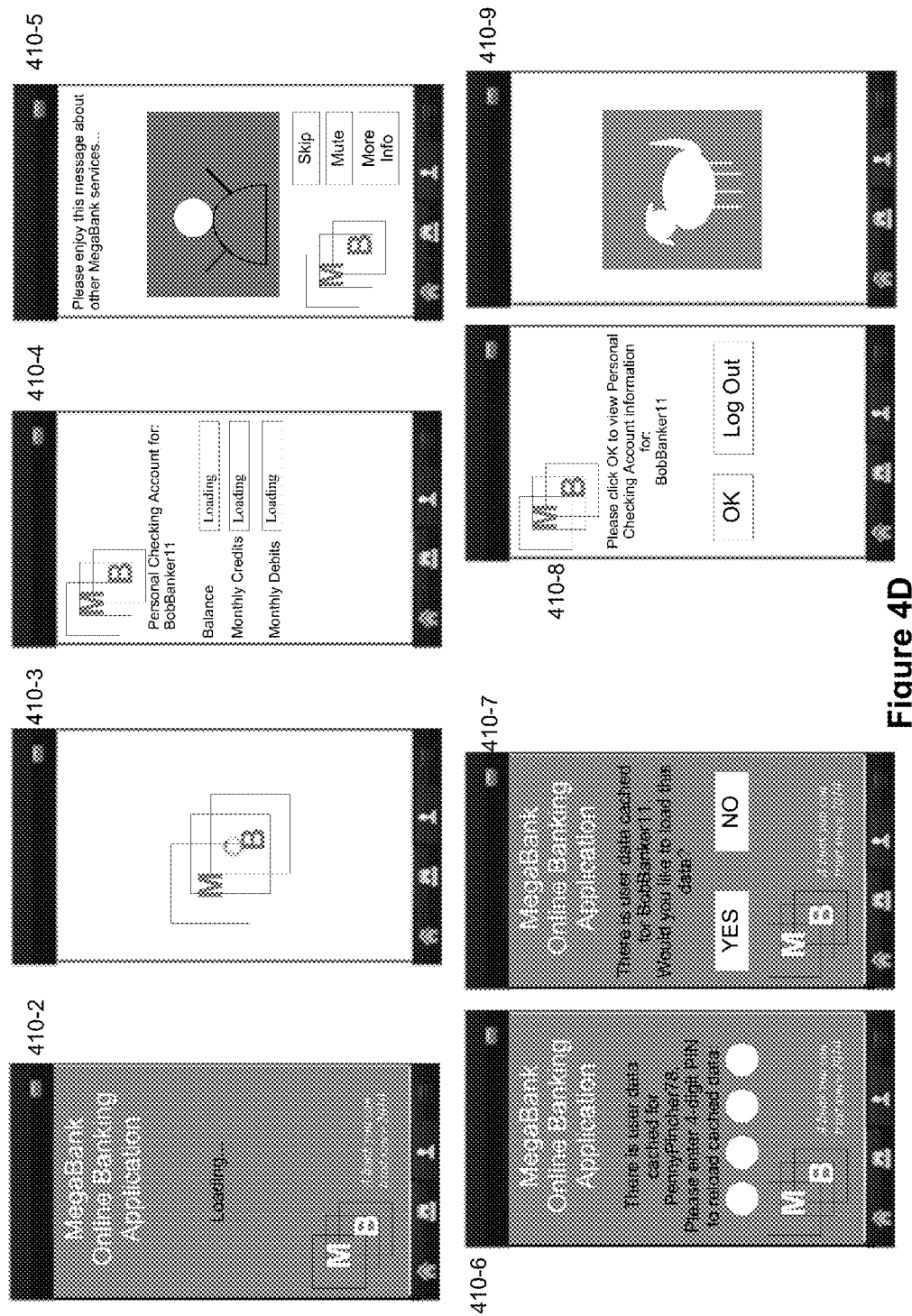

FIG. 4D illustrates several embodiments of protective user interfaces. These exemplary protective user interfaces can, for example, be displayed in the sequence of user interfaces 408, 410-1 and 412, depicted in FIG. 4C. User interface 410-2 illustrates a protective user interface that comprises one or more identifying graphical elements of the application opened by the first user. In some embodiments the protective user interface comprises text-based information to inform the user that data is being loaded or retrieved from a remote server before displaying the user's personal data. In some embodiments, such as shown in user interface 410-3, the protective user interface comprises graphical objects, such as a logo, or photograph. A user interface could also combine static objects such as a logo with animated objects such as a rotating graphic or an emptying hourglass.

User interface 410-4 illustrates a protective user interface that comprises the application data for the non-personal data associated with the respective application. In some or all of the locations in the user interface where personal user data is to be displayed, predefined text (e.g., the word "Loading") is displayed in its place. In some embodiments, some or all of the locations in the user interface where personal user data is to be displayed, are left blank until the first user's personal user data is available to display.

User interface 410-5 illustrates a protective user interface that comprises a video or animation. In some embodiments, the user is able to control the video, for example by starting, stopping, pausing, muting or rewinding playback of the video. In some embodiments, the first user can skip viewing the video when the application has retrieved the first user's personal user information, or at any time thereafter.

User interface 410-6 illustrates an exemplary user interface that permits loading of the cached user data for a different user than the one that has logged into the application (e.g., in user interface 408, FIG. 4C). In this example, the name or username of the user associated with the cached data is displayed, along with a passcode entry user interface element. In some embodiments, the passcode is a passcode associated with the mobile device (e.g., a code to lock a smartphone). In some embodiments, the passcode is a code associated with the user account of the user associated with the cached data (e.g., PennyPincher78's bank personal identification number). In some embodiments, it may be desirable to load such cached data, if the first user wishes to monitor the activity of a secondary user of the mobile device (e.g., if the first user is a parent and the secondary user is a child). It may also be desirable to be able to load the cached data if a data connection is nonexistent or weak, making retrieval of the first user's data slow or difficult.

User interface 410-7 illustrates an exemplary protective user interface that indicates the presence of personal user data of the first user (e.g., BobBanker11), in cached memory on the mobile device. In some embodiments, the first user can choose to view this cached data through a prompt on the protective user interface, and in some embodiments, the first user has to enter a password (as in user interface 410-6) to view the cached first user personal data. In situations where a data or network connection is weak or non-existent, the first user may choose to view cached data if doing so is helpful while waiting for the current first user personal information to be retrieved from a remote server.

User interface 410-8 illustrates an exemplary protective user interface that has retrieved the personal user data of the first user (e.g., BobBanker11), but does not display such data until a confirmation to view the data has been received (e.g., clicking "OK"). In some embodiments, the protective user interface comprises a feedback mechanism to prompt the application to log-out or sign-out the first user. In some embodiments, if the application does not receive confirmation to view the first user's data within a predetermined amount of time (e.g., 2 minutes), the application will automatically log out the first user and will never have displayed the first user's personal information. In some embodiments, the application will display another user interface in response to the failure to detect confirmation to view the first user's personal data within a predetermined amount of time. In some embodiments, this other user interface indicates that the first user's window of time to view his personal user information has expired. In some embodiments, this other user interface reverts back to a user interface allowing for the first user to re-enter identifying information (e.g., user interface 408 in FIG. 4C).

User interface 410-9 illustrates an exemplary protective user interface that depicts a personal or personally-chosen image or photograph by the first user. For example, the image depicted in user interface 410-9 is the first user's dog. In some embodiments, the application or the entity associated with the application (e.g., MegaBank), allows the first user to select an image or photograph to be associated with his account, and this image is displayed on the protective user interface.

Figure 5A:
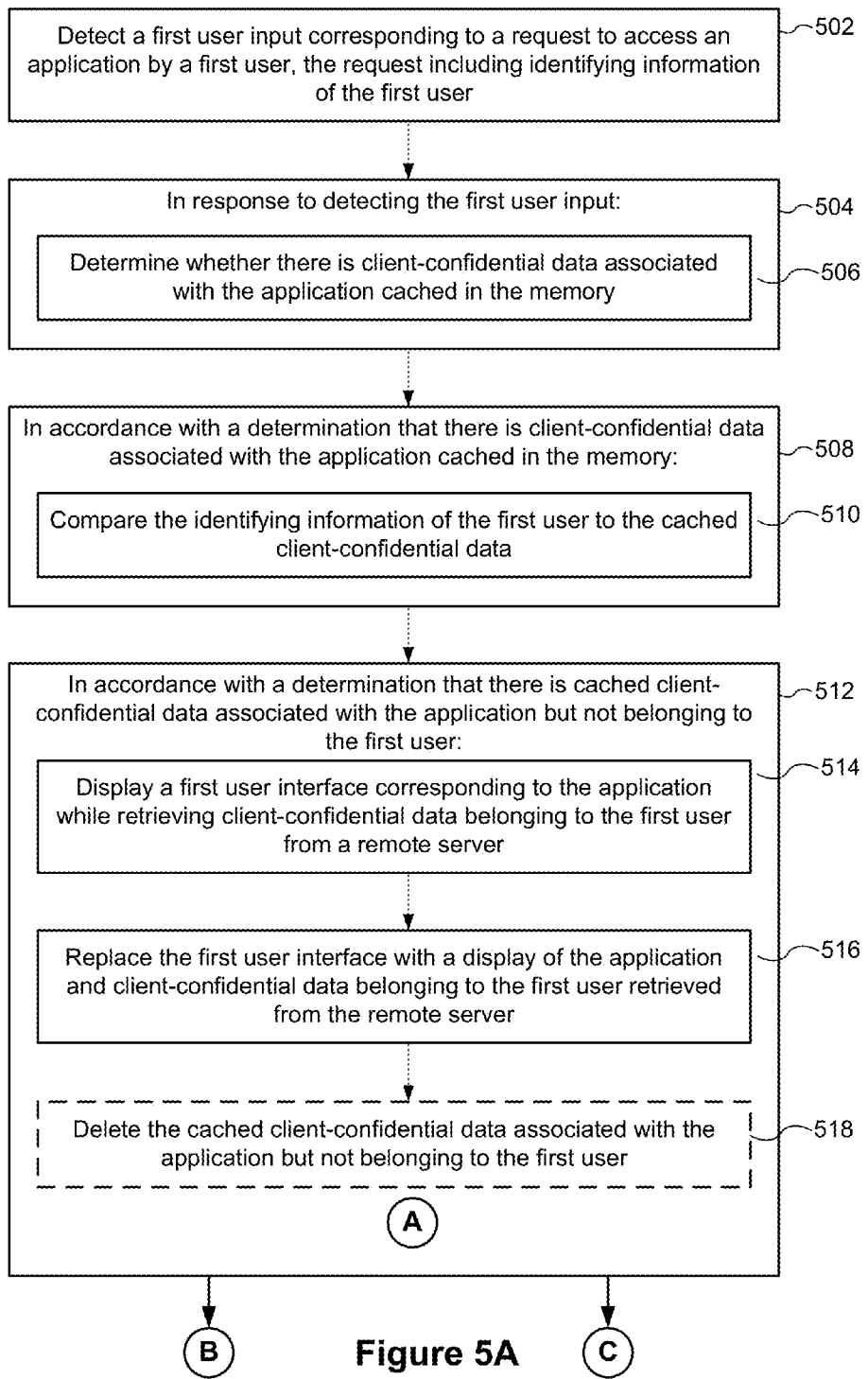
FIGS. 5A-5C are a flow chart of a method of displaying a protective user interface in accordance with some implementations of the present application.
Figure 5B:
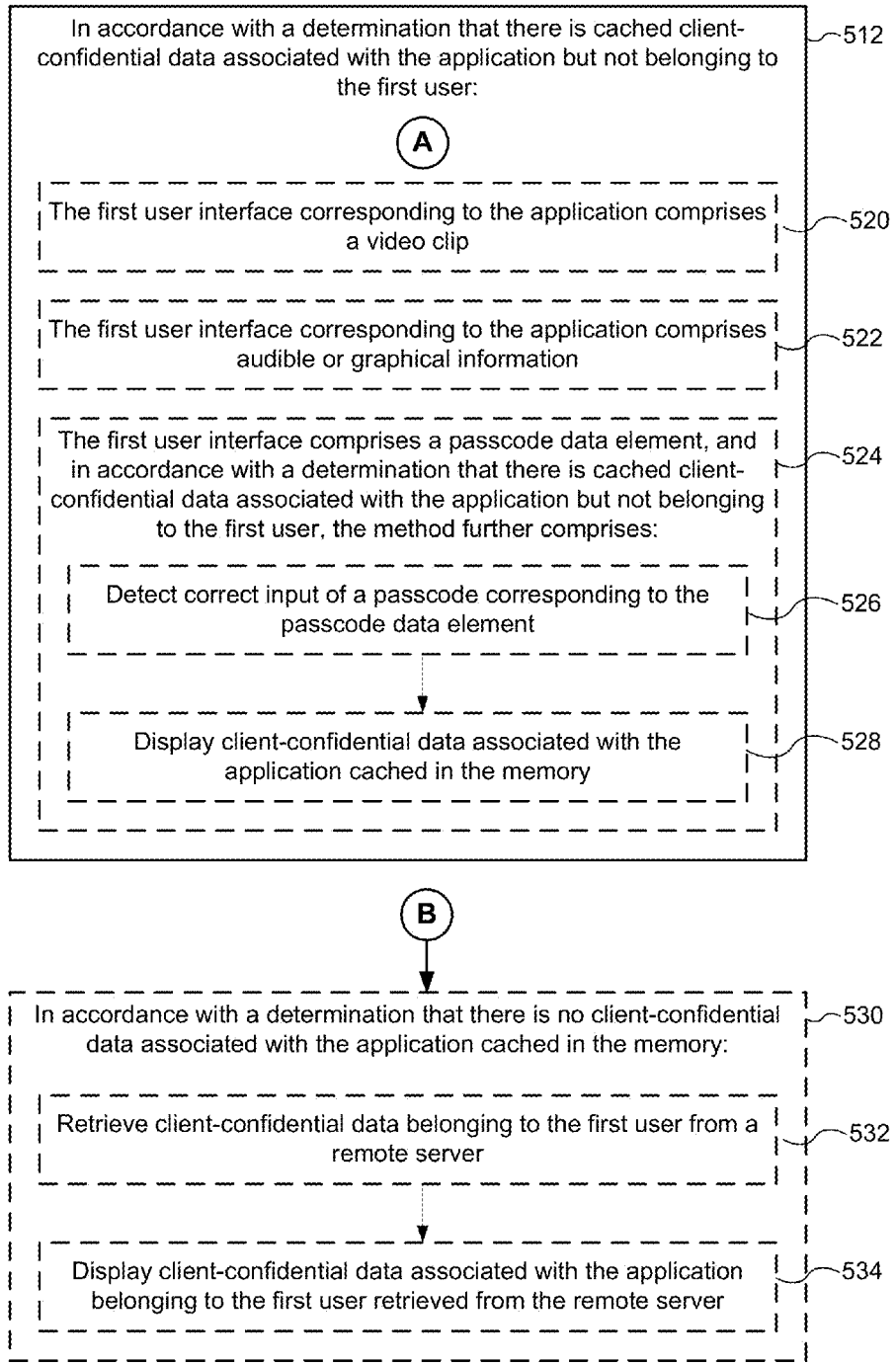
Figure 5C:
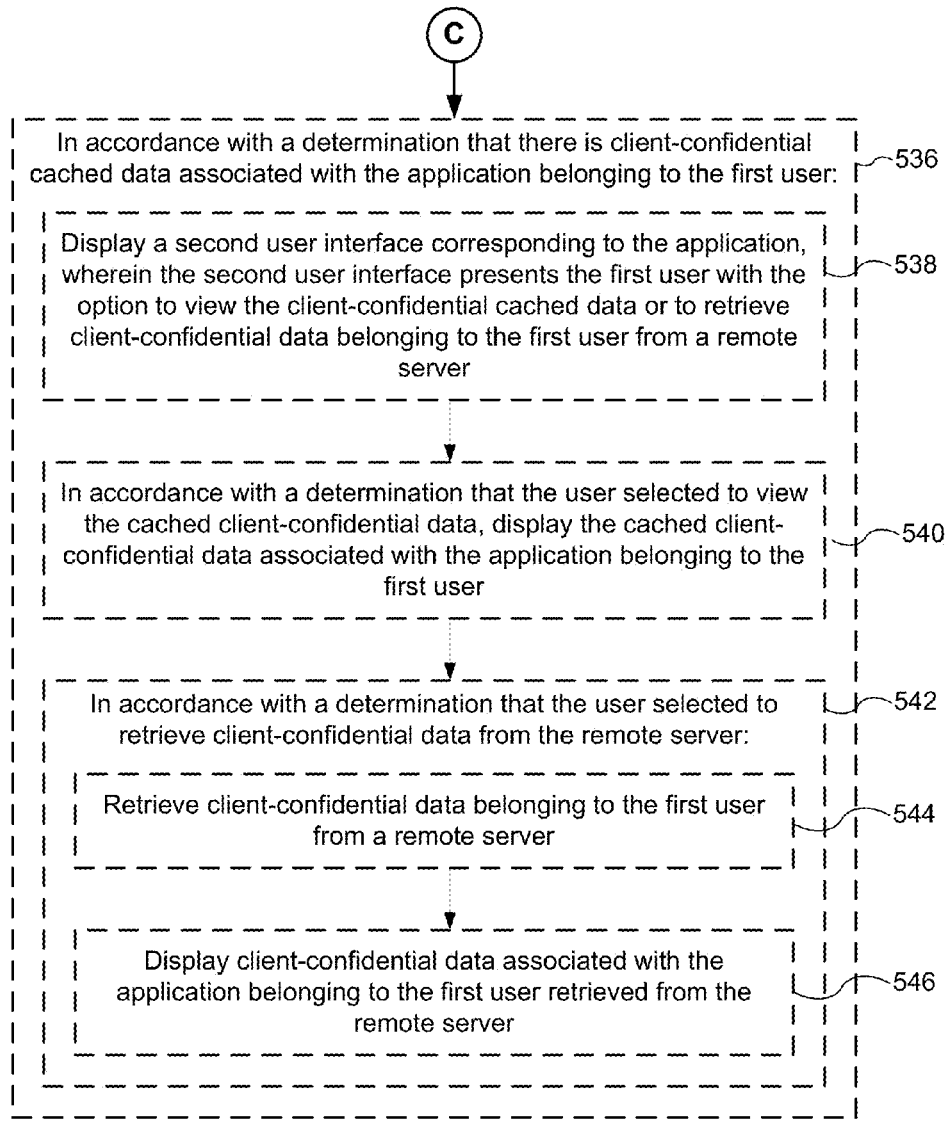

FIGS. 5A to 5C depict a flow chart of a method 500 of displaying a protective user interface in accordance with some implementations of the present application. At a portable electronic device having one or more processors and memory for storing programs to be executed by the one or more processors, the method comprises detecting (502) a first user input corresponding to a request to access an application by a first user, the request including identifying information of the first user (e.g., as shown in user interface 408, FIG. 4C). The method further includes, in response to the first user input (504), determining (506) whether there is client-confidential data associated with the application cached in the memory. The method further includes, in accordance with a determination that there is client-confidential data associated with the application cached in the memory (508), comparing (510) the identifying information of the first user to the cached client-confidential data.

The method further includes, in accordance with a determination that there is cached client-confidential data associated with the application but not belonging to the first user (512), displaying (514) a first user interface (e.g., protective user interfaces 410-1 to 410-9, FIGS. 4C and 4D) corresponding to the application while retrieving client-confidential data belonging to the first user from a remote server and replacing (516) the first user interface with a display of the application and client-confidential data belonging to the first user retrieved from the remote server (e.g., user interface 412, FIG. 4C). In some embodiments, the method further includes, in accordance with a determination that there is cached client-confidential data associated with the application but not belonging to the first user, deleting (518) the cached client-confidential data associated with the application but not belonging to the first user.

In some embodiments, the first user interface corresponding to the application comprises a video clip (522) (e.g., user interface 410-5, FIG. 4D). In some embodiments, the first user interface corresponding to the application comprises audible or graphical information.

In some embodiments, the first user interface comprises (526) a passcode data element, and the method further comprises: detecting (528) correct input of a passcode corresponding to the passcode data element and displaying (530) client-confidential data associated with the application cached in the memory.

In some embodiments, the method further comprises, in accordance with a determination that there is no client-confidential data associated with the application cached in the memory (532), retrieving (534) client-confidential data belonging to the first user from a remote server and displaying (536) client-confidential data associated with the application belonging to the first user retrieved from the remote server.

In some embodiments, the method further comprises, in accordance with a determination that there is client-confidential cached data associated with the application belonging to the first user (538), displaying (540) a second user interface corresponding to the application, wherein the second user interface presents the first user with the option to view the client-confidential cached data or to retrieve client-confidential data belonging to the first user from a remote server. The method further comprises, in accordance with a determination that the user selected to view the cached client-confidential data, displaying (542) the cached client-confidential data associated with the application belonging to the first user. In some embodiments, the method includes, in accordance with a determination that the user selected to retrieve client-confidential data from the remote server (544), retrieving (546) client-confidential data belonging to the first user from a remote server and displaying (548) client-confidential data associated with the application belonging to the first user retrieved from the remote server.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

In fact, there are various forms to implement specifically the realization device for the generation of protective user interfaces mentioned in the embodiment of the present application. For example, through application interface following certain specifications, the realization device for the generation of protective user interfaces can be written as plug-in installed in browser, and packaged as application used for downloading by users themselves as well. When written as plug-in, it is allowed to be implemented as various plug-in forms including ocx, dll, cab, etc. And it is acceptable to implement the realization device for the generation of a protective user interface mentioned in the embodiment of the invention through specific technologies including Flash plug-in, RealPlayer plug-in, MMS plug-in, MI stave plug-in, ActiveX plug-in, etc.

Through storage methods of instruction or instruction set, the method for the generation of protective user interfaces mentioned in the embodiment of the invention can be stored in various storage media. These storage media include but not limited to: floppy disk, CD, DVD, hard disk, Nand flash, USB flash disk, CF card, SD card, MMC card, SM card, Memory Stick (Memory Stick), xD card, etc.

In addition, the method for the generation of protective user interfaces mentioned in the embodiment of the invention can also be applied to storage medium based on Nand flash, for example, USB flash disk, CF card, SD card, SDHC card, MMC card, SM card, Memory Stick, xD card and so on.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of displaying a user interface on a portable electronic device comprising:
at the portable electronic device having one or more processors and memory for storing programs to be executed by the one or more processors:
detecting a first user input corresponding to a request to access an application by a first user, the request including identifying information of the first user, wherein the identifying information includes an account name and a password for accessing the application;
in response to detecting the first user input:
determining whether there is client-confidential data associated with the application cached in the memory, wherein the client-confidential data includes account data of at least one user account associated with the application, and
whether the account data of the at least one user account matches the identifying information;
in accordance with a determination that the cached client-confidential data associated with the application belongs to the first user:
displaying a second user interface corresponding to the application, wherein the second user interface presents the first user with the option to view the cached client-confidential data or to retrieve client-confidential data belonging to the first user from a remote server;
in accordance with a determination that the user selects to view the cached client-confidential data, displaying the cached client-confidential data associated with the application belonging to the first user;
in accordance with a determination that the user selected to retrieve client-confidential data from the remote server:
retrieving client-confidential data belonging to the first user from a remote server; and
displaying client-confidential data associated with the application belonging to the first user retrieved from the remote server.

2. The method of claim 1, further comprising:
in accordance with a determination that there is no client-confidential data associated with the application cached in the memory:
retrieving client-confidential data belonging to the first user from a remote server; and
displaying client-confidential data associated with the application belonging to the first user retrieved from the remote server.

3. The method of claim 1, further comprising:
in accordance with a determination that there is cached client-confidential data associated with the application but not belonging to the first user, deleting the cached client-confidential data associated with the application but not belonging to the first user.

4. The method of claim 1, wherein the first user interface corresponding to the application comprises a video clip.

5. The method of claim 1, wherein the first user interface corresponding to the application comprises audible or graphical information.

6. The method of claim 1, wherein the first user interface comprises a passcode data element, and the method further comprises:
in accordance with a determination that the cached client-confidential data associated with the application does not belong to the first user:
detecting correct input of a passcode corresponding to the passcode data element for viewing the cached client-confidential data associated with the application but not belonging to the first user; and
displaying the client-confidential data associated with the application but not belonging to the first user cached in the memory.

7. An electronic device, comprising:
a display;
one or more processors;
memory; and
one or more programs, wherein the one or more programs are stored in the memory and configured to be executed by the one or more processors, the one or more programs including instructions for:
detecting a first user input corresponding to a request to access an application by a first user, the request including identifying information of the first user, wherein the identifying information includes an account name and a password for accessing the application;
in response to detecting the first user input:
determining whether there is client-confidential data associated with the application cached in the memory, wherein the client-confidential data includes account data of at least one user account associated with the application, and whether the account data of the at least one user account matches the identifying information;
in accordance with a determination that the cached client-confidential data associated with the application belongs to the first user:
displaying a second user interface corresponding to the application, wherein the second user interface presents the first user with the option to view the cached client-confidential data or to retrieve client-confidential data belonging to the first user from a remote server;
in accordance with a determination that the user selected to view the cached client-confidential data, displaying the cached client-confidential data associated with the application belonging to the first user;
in accordance with a determination that the user selected to retrieve client-confidential data from the remote server:
retrieving client-confidential data belonging to the first user from a remote server; and
displaying client-confidential data associated with the application belonging to the first user retrieved from the remote server.

8. The device of claim 7, further including instructions for:
in accordance with a determination that there is no client-confidential data associated with the application cached in the memory:
retrieving client-confidential data belonging to the first user from a remote server; and
displaying client-confidential data associated with the application belonging to the first user retrieved from the remote server.

9. The device of claim 7, further including instructions for:
in accordance with a determination that there is cached client-confidential data associated with the application but not belonging to the first user, deleting the cached client-confidential data associated with the application but not belonging to the first user.

10. The device of claim 7, wherein the first user interface corresponding to the application comprises a video clip.

11. The device of claim 7, wherein the first user interface corresponding to the application comprises audible or graphical information.

12. The device of claim 7, wherein the first user interface comprises a passcode data element, and further including instructions for:
in accordance with a determination that the cached client-confidential data associated with the application does not belong to the first user:
detecting correct input of a passcode corresponding to the passcode data element for viewing the cached client-confidential data associated with the application but not belonging to the first user; and
displaying the client-confidential data associated with the application but not belonging to the first user cached in the memory.

13. A non-transitory computer readable storage medium storing one or more programs, the one or more programs comprising instructions, which when executed by an electronic device with a display and a camera, cause the device to:
detect a first user input corresponding to a request to access an application by a first user, the request including identifying information of the first user, wherein the identifying information includes an account name and a password for accessing the application;
in response to detecting the first user input:
determine whether there is client-confidential data associated with the application cached in the memory, wherein the client-confidential data includes account data of at least one user account associated with the application, and whether the account data of the at least one user account matches the identifying information;
in accordance with a determination that the cached client-confidential data associated with the application belongs to the first user:
displaying a second user interface corresponding to the application, wherein the second user interface presents the first user with the option to view the cached client-confidential data or to retrieve client-confidential data belonging to the first user from a remote server;
in accordance with a determination that the user selected to view the cached client-confidential data, displaying the cached client-confidential data associated with the application belonging to the first user;
in accordance with a determination that the user selected to retrieve client-confidential data from the remote server:
retrieving client-confidential data belonging to the first user from a remote server; and
displaying client-confidential data associated with the application belonging to the first user retrieved from the remote server.

14. The non-transitory computer readable storage medium of claim 13, further comprising instructions that cause the device to:
in accordance with a determination that there is no client-confidential data associated with the application cached in the memory:
retrieve client-confidential data belonging to the first user from a remote server; and
display client-confidential data associated with the application belonging to the first user retrieved from the remote server.

15. The non-transitory computer readable storage medium of claim 13, comprising instructions that cause the device to:
   in accordance with a determination that there is cached client-confidential data associated with the application but not belonging to the first user, delete the cached client-confidential data associated with the application but not belonging to the first user.

16. The non-transitory computer readable storage medium of claim 13, wherein the first user interface corresponding to the application comprises a video clip.

17. The non-transitory computer readable storage medium of claim 13, wherein the first user interface corresponding to the application comprises audible or graphical information.

18. The non-transitory computer readable storage medium of claim 13, wherein the first user interface comprises a passcode data element, and comprising instructions that cause the device to:
   in accordance with a determination that the cached client-confidential data associated with the application but does not belong to the first user:
      detect correct input of a passcode corresponding to the passcode data element for viewing the cached client-confidential data associated with the application but not belonging to the first user; and
      display the client-confidential data associated with the application but not belonging to the first user cached in the memory.

* * * * *